(12) United States Patent
Raghoebardajal

(10) Patent No.: US 11,033,807 B2
(45) Date of Patent: Jun. 15, 2021

(54) DATA PROCESSING

(71) Applicant: Sony Interactive Entertainment Inc., Tokyo (JP)

(72) Inventor: Sharwin Winesh Raghoebardajal, Surbiton/Surrey (NL)

(73) Assignee: Sony Interactive Entertainment Inc., Tokyo (JP)

(*) Notice: Subject to any disclaimer, the term of this patent is extended or adjusted under 35 U.S.C. 154(b) by 208 days.

(21) Appl. No.: 16/469,858

(22) PCT Filed: Dec. 19, 2017

(86) PCT No.: PCT/GB2017/053805
§ 371 (c)(1),
(2) Date: Jun. 14, 2019

(87) PCT Pub. No.: WO2018/115844
PCT Pub. Date: Jun. 28, 2018

(65) Prior Publication Data
US 2019/0358525 A1    Nov. 28, 2019

(30) Foreign Application Priority Data
Dec. 23, 2016    (GB) ..................................... 1622180

(51) Int. Cl.
| A63F 13/213 | (2014.01) |
| A63F 13/211 | (2014.01) |
| A63F 13/235 | (2014.01) |

(52) U.S. Cl.
CPC .......... *A63F 13/213* (2014.09); *A63F 13/211* (2014.09); *A63F 13/235* (2014.09)

(58) Field of Classification Search
CPC .... A63F 13/211; A63F 13/213; A63F 13/223; G06F 1/163; G06F 3/0304; G06F 3/038; G06F 3/011; G06F 3/012; G06F 3/013
(Continued)

(56) References Cited

U.S. PATENT DOCUMENTS 5,068,529 A    11/1991  Ohno
9,348,141 B2 *  5/2016  Bar-Zeev ................ G06F 3/013
(Continued)

FOREIGN PATENT DOCUMENTS

WO    2015044851 A2    4/2015

OTHER PUBLICATIONS

International Search Report and Written Opinion for corresponding PCT Application No. PCT/GB2017/053805, 12 pages, dated Feb. 20, 2019.
(Continued)

*Primary Examiner* — Michael A Cuff
(74) *Attorney, Agent, or Firm* — Matthew B. Dernier, Esq.

(57) ABSTRACT

A system includes a data processing apparatus; and a position detector to detect a position of a trackable object at successive sampling time points, the position detector being configured to provide, by a first data communication path, position data indicative of the position of the trackable object to the data processing apparatus at each sampling time point along with data indicating a time of that sampling time point according to a clock signal at the position detector, and to send synchronisation data to the data processing apparatus by a second, different, data communication path indicative of the clock signal at the position detector; in which the data processing apparatus comprises: a detector to detect a difference between a clock signal at the data processing apparatus and the clock signal at the position detector in dependence upon the synchronisation data; and a processor to perform a data processing operation in dependence upon the position indicated by the position data, the time of a sampling time point associated with that position data, and the detected difference between the clock signal at
(Continued)

the data processing apparatus and the clock signal at the position detector.

18 Claims, 11 Drawing Sheets

(58) Field of Classification Search
USPC .......................................................... 463/37
See application file for complete search history.

(56) References Cited

U.S. PATENT DOCUMENTS

| | | |
|---|---|---|
| 2012/0105473 A1 | 5/2012 | Bar-Seev |
| 2014/0002444 A1* | 1/2014 | Bennett ................. G06F 3/0304 |
| | | 345/419 |
| 2014/0159995 A1* | 6/2014 | Adams ..................... G02C 5/16 |
| | | 345/8 |
| 2016/0080633 A1* | 3/2016 | Hong ................. H04N 5/23212 |
| | | 348/169 |
| 2017/0031502 A1* | 2/2017 | Rosenberg .......... G06F 3/04144 |
| 2017/0143271 A1* | 5/2017 | Gustafsson .......... A61N 5/1049 |

OTHER PUBLICATIONS

Search Report for corresponding GB Application No. 1622180.6, 1 page, dated Jun. 14, 2017.

* cited by examiner

LEFT  RIGHT

DATA PROCESSING

BACKGROUND

Field of the Disclosure

This disclosure relates to data processing.

Description of the Prior Art

Some data processing activities may be controlled by a detection of a position of a trackable device, for example.

An example arrangement involves a games machine, in which movements of a device such as a head mountable display (HMD) and/or a hand-holdable controller such as a Sony® Move® Controller, can be tracked by a camera.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
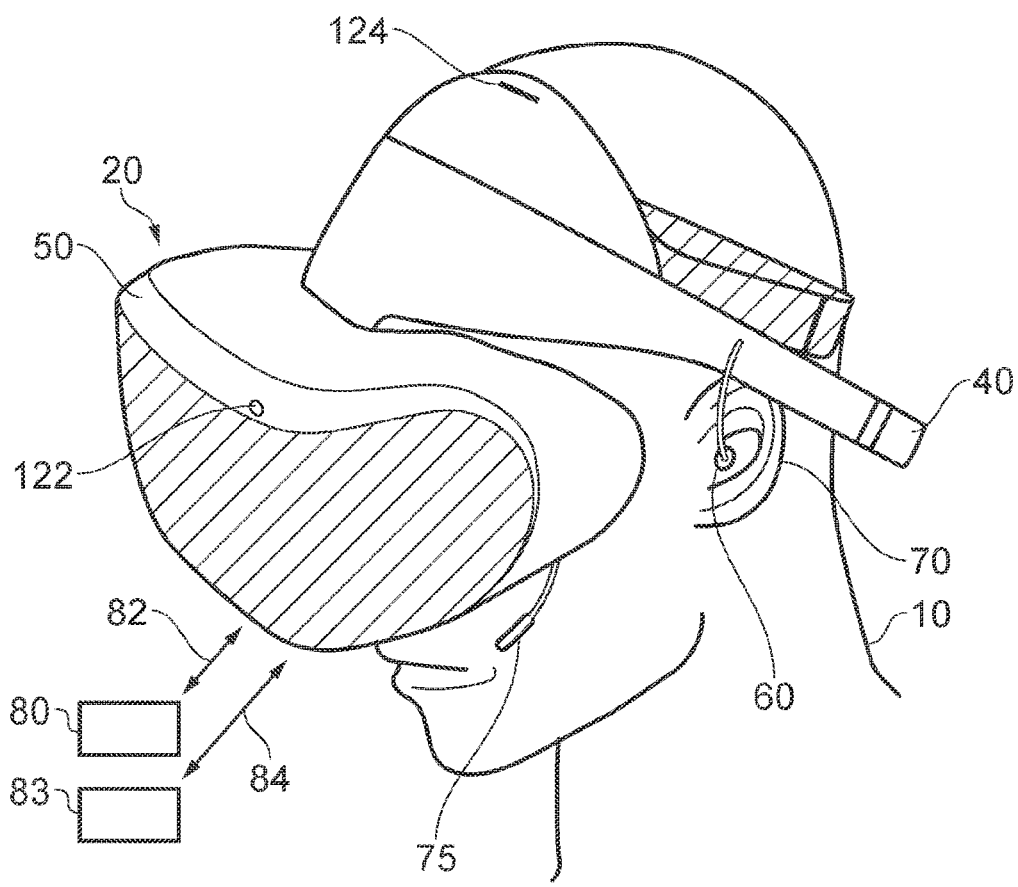
FIG. 1 schematically illustrates an HMD worn by a user.

Referring now to FIG. 1, a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
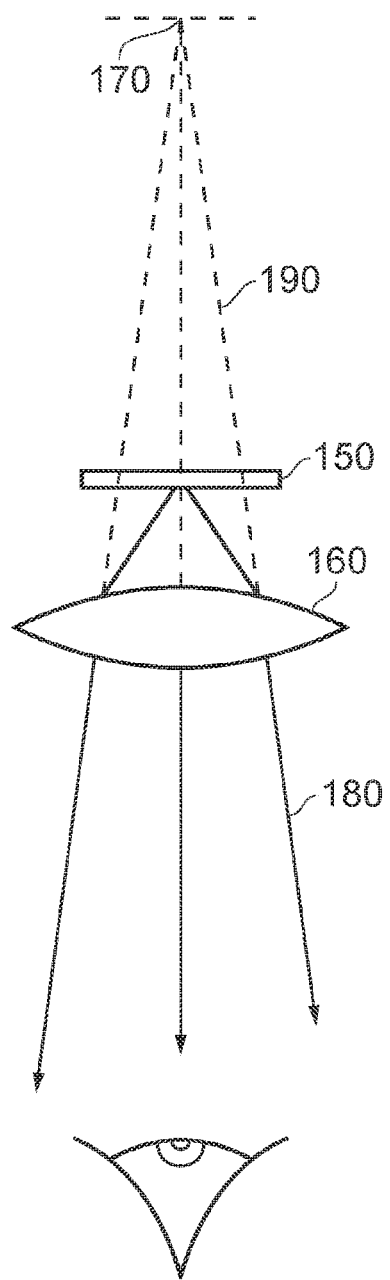
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
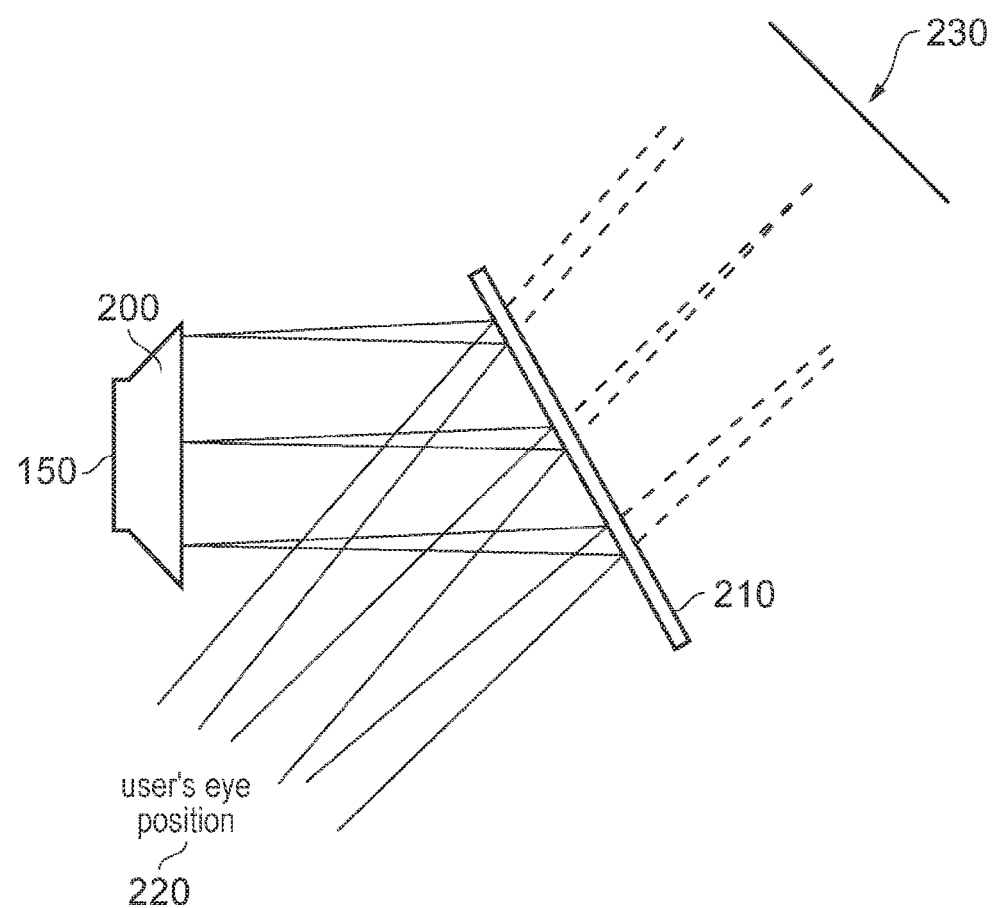
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
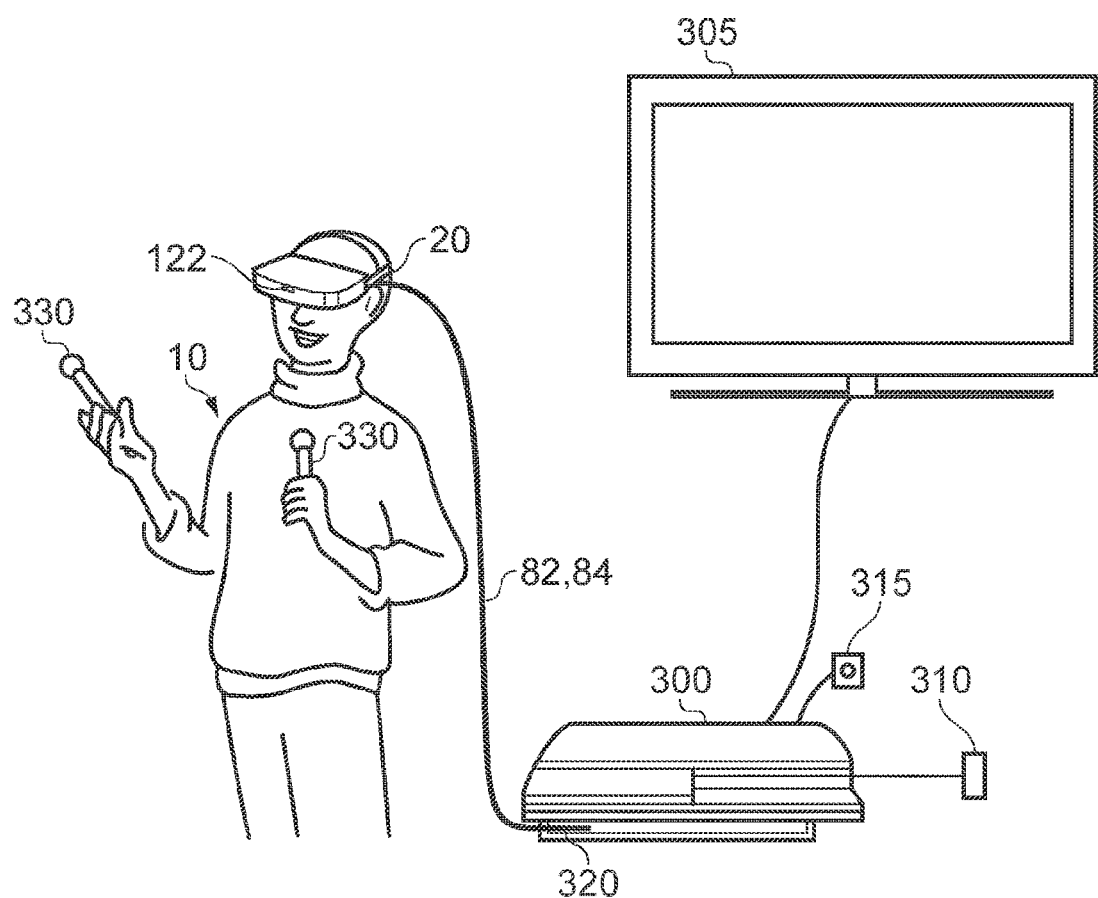
FIGS. 6 and 7 schematically illustrate a user wearing an HMD connected to a Sony® PlayStation 3® games console.

FIG. 6 schematically illustrates an example virtual reality system and in particular shows a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 6, the user is also shown holding a pair of hand-held controller 330s which may be, for example, Sony® Move® controllers which communicate wirelessly with the games console 300 to control (or to contribute to the control of) game operations relating to a currently executed game program.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 6 also shows a separate display 305 such as a television or other openly viewable display (by which it is meant that viewers other than the HMD wearer may see images displayed by the display 305) and a camera 315, which may be (for example) directed towards the user (such as the HMD wearer) during operation of the apparatus. An example of a suitable camera is the PlayStation Eye camera, although more generally a generic "webcam", connected to the console 300 by a wired (such as a USB) or wireless (such as WiFi or Bluetooth) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see the virtual environment (or a subset, version or representation of it) as seen by the HMD wearer. In other examples, the social screen could display other material such as information relating to the HMD wearer's current progress through the ongoing computer game. For example, the HMD wearer could see the game environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

Figure 7:
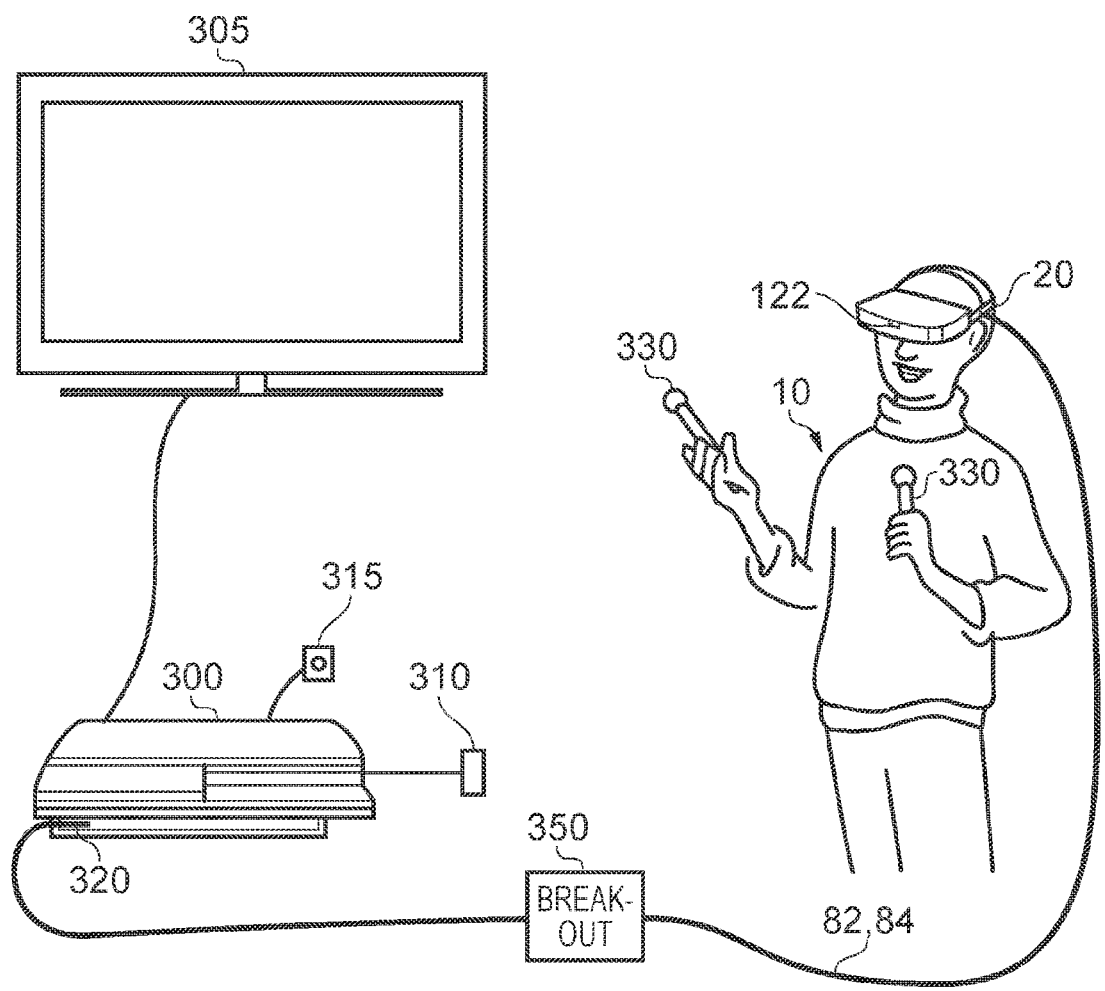

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
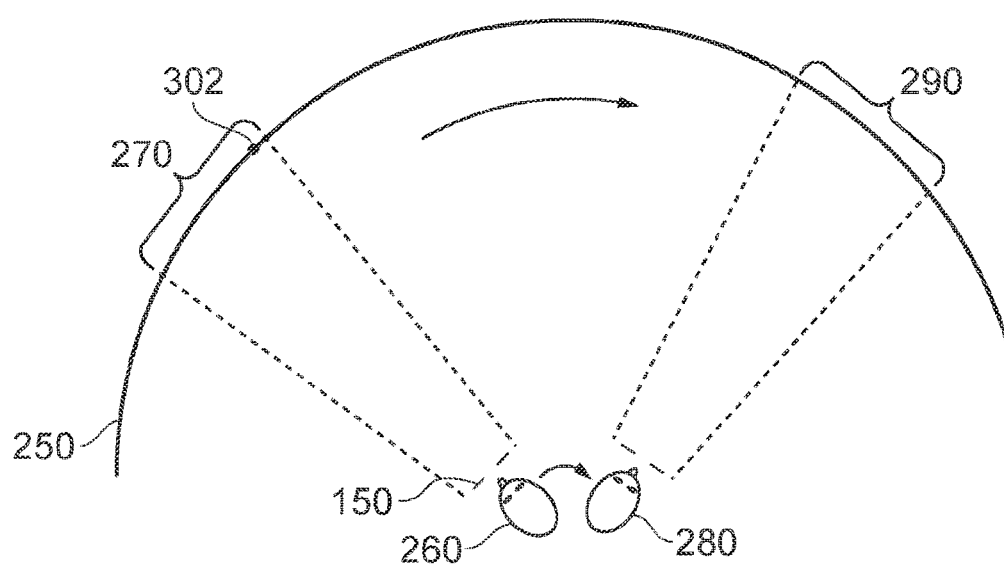
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
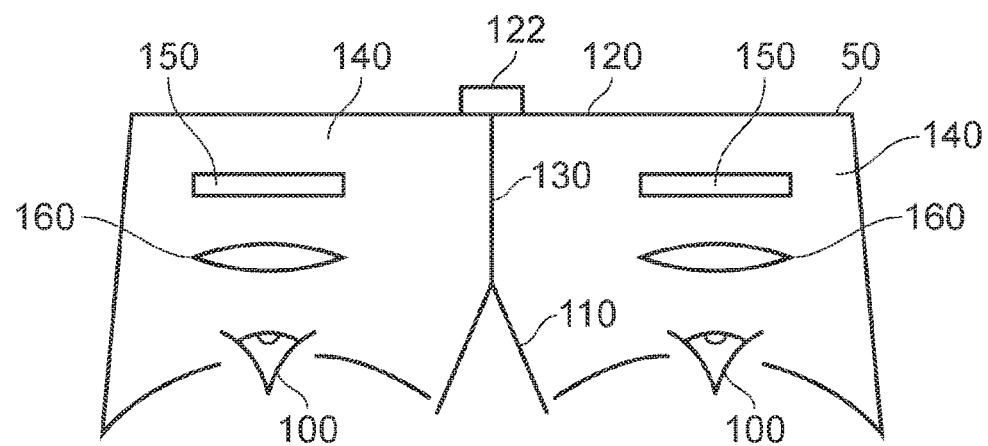
FIG. 2 is a schematic plan view of an HMD.
Figure 9A:
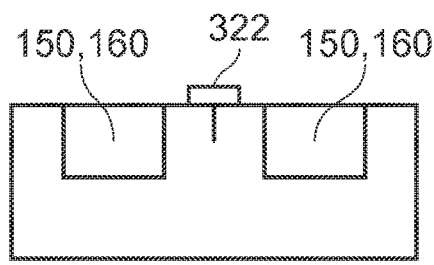
FIGS. 9a and 9b schematically illustrate HMDs with motion sensing.
Figure 9B:
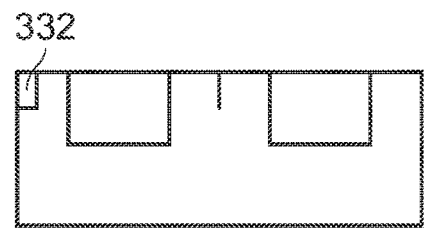

FIGS. 9*a* and 9*b* schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9*a*, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9*b* makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
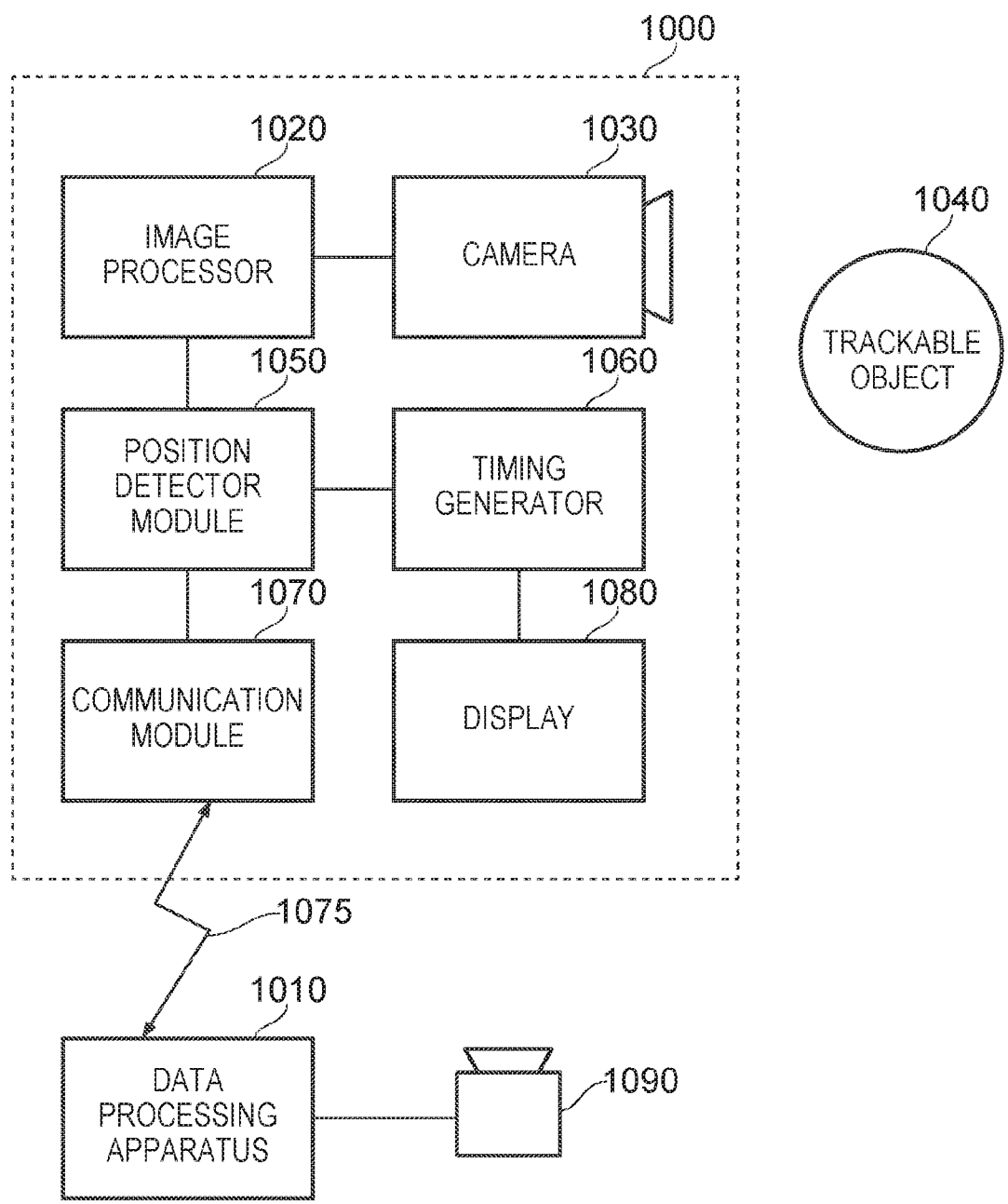
FIG. 10 schematically illustrates a data processing system.

FIG. 10 schematically illustrates a data processing system comprising a data processing apparatus 1010 such as a computer games machine of the type discussed above, a position detector 1000 in communication with the data processing apparatus and a trackable object 1040.

An example of the trackable object 1040 is the Move controller 330 discussed above. Another example is the HMD itself, which can be optically tracked by recognising its shape, colour, configuration and/or illumination (for example by means of LEDs disposed on and around the case of the HMD). More than one trackable object can be in use at a particular time. In some examples, the trackable objects may be distinguished from one another by their colour; for example, the data processing apparatus could wirelessly instruct each of multiple Move controllers to be illuminated in different respective colours.

The position detector 1000 may be implemented as, for example, a mobile telephone device. This can be located at another location within the real environment relative to the trackable object 1040, which is to say a different location to that of the data processing apparatus 1010 and a camera 1090 associated with the data processing apparatus. A potential advantage of locating the position detector 1000 at a different location to that of the data processing apparatus and its associated camera 1090 is that if a camera view for the camera 1090 is obscured, there is a chance that the position detector 1000 will still have a camera view of the trackable object and so can maintain tracking even when the camera 1090 is not able to do so.

The position detector 1000 comprises (potentially with other features, not shown) an image processor 1020, a camera 1030, a position detector module 1050, a timing generator 1060, a communication module 1070 and a display 1080.

The camera 1030 (for example, a front-facing camera forming part of the mobile telephone device) captures images of the trackable object 1040. These images are processed by the image processor 1020 to detect image features relating to the trackable object 1040, and these detected image features are used by the position detector module 1050 to detect a current position of the trackable object 1040. The communication module transmits the current position to the data processing apparatus by a wireless connection 1075, for example a Bluetooth or a Wi-Fi connection.

The timing generator 1060 generates a local timing clock at the position detector 1000. The position detector module 1050 associates a sampling time point derived from the clock signal provided from the timing generator 1060 with data indicating a position of the trackable object and sends both items of information via the communication module 1070 to the data processing apparatus. Separately, the position detector 1000 sends synchronisation data to the data processing apparatus by a second, different data communication path. The synchronisation data is indicative of the clock signal generated by the timing generator 1060 at the position detector. An example of the second data communication path is by the display of relevant images on the display 1080 (for example, the front display screen forming part of the mobile telephone device 1000), which images are detected by the camera 1090.

Some reasons why two data communication paths are provided will be discussed below.

Figure 11:
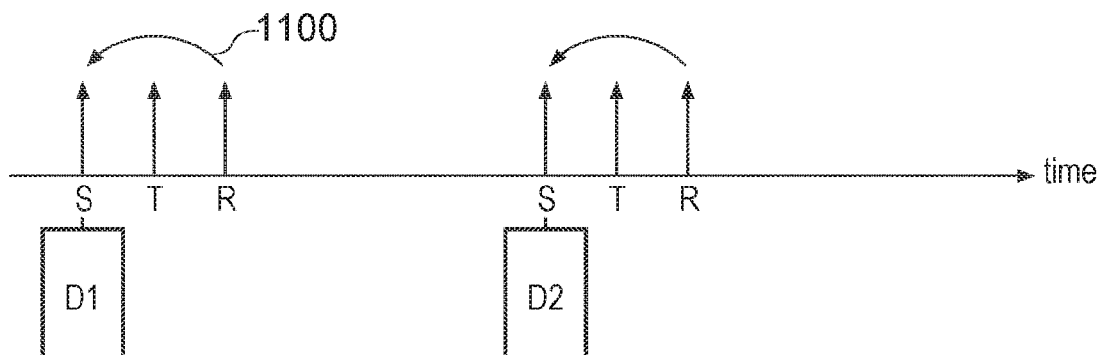
FIG. 11 is a schematic timing diagram.

FIG. 11 is a schematic timing diagram relating to the sampling of the position of the trackable object 1040 and the transmission of data relating to the sampled position to the data processing apparatus 1010. In FIG. 11, time is shown running horizontally from an earlier time to the left of the diagram towards a later time at the right of the diagram.

A sampling time point (S) represents a time at which the position detector module 1050 detects the current position of the trackable object from images captured by the camera 1030 and processed by the image processor 1020. A transmission time (T) represents a time at which the position detector module initiates the transmission of the sampled position to the data processing apparatus 1010 via the communication module 1070. A reception time (R) represents a time at which the data processing apparatus 1010 has successfully received the transmission from the communication module 1070 indicated in the sampled position. The three time points S, T, R are shown separated in time. A gap or difference between the time points S and T relates primarily to a processing delay at the position detector module 1050 and may in fact be trivially small in the present context. However, the time gap or difference between the time points T and R may be rather longer in the context of synchronising the tracking of an object with data processing activity such as gameplay taking place at the data processing apparatus 1010.

One potential reason for the gap between the time points T and R is the inherent latency of the communications link 1075. Latency is a known aspect of communication links such as Bluetooth communication links. The latency can have a magnitude which is significant in comparison to the progress of gameplay or other data processing activities at the data processing apparatus 1010.

In the example of FIG. 11, at the sampling time points S, a display image or pattern D1, D2 is displayed by the timing generator 1060 on the display 1080. This display can be captured by the camera 1090 and analysed by the data processing apparatus 1010. In the example of FIG. 11, the initiation of the display D1, D2 indicates the sampling time point S in each case. This allows the data processing apparatus 1010 to detect and be aware of the real time at the sampling time point so that when the data processing apparatus subsequently receives the position data at the time point R, the data processing apparatus can map the position data back (shown schematically by an arrow 1100 to the sampling time point S and base its operations on the correct time point associated with that position data.

The arrangement of FIG. 11 in which the initiation of the display of the relevant image or pattern D1, D2 indicates the sampling time point S is just one example. Other examples will be discussed below.

Figure 12:
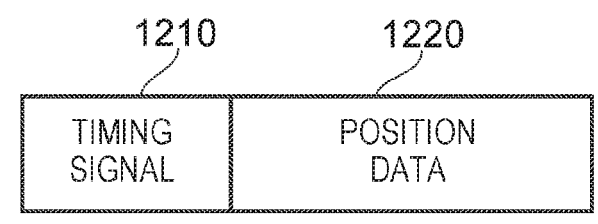
FIG. 12 schematically illustrates a data packet.

FIG. 12 schematically illustrates a data packet such as a packet transmitted by the communication module 1070 via the communication path 1075 to the data processing apparatus 1010. The data packet 1200 comprises a timing signal 1210 and position data 1220.

In some examples, the timing signal indicates the time of the sampling point S relative to the local clock generated by the timing generator 1060. The data transmitted by the second communication path (the display 1080 to the camera 1090) allows a clock or timing signal at the data processing apparatus 1010 to be established in synchronism with the operation of the timing generator 1060. So, the timing signal 1210 indicates a time, relative to the version of the clock signal operating at the data processing apparatus 1010, of the sampling operation which took place at the position detector module 1050.

The position data field 1220 may contain appropriate information to define the position of the trackable object 1040 as detected by the position detector module 1050.

Figure 13:
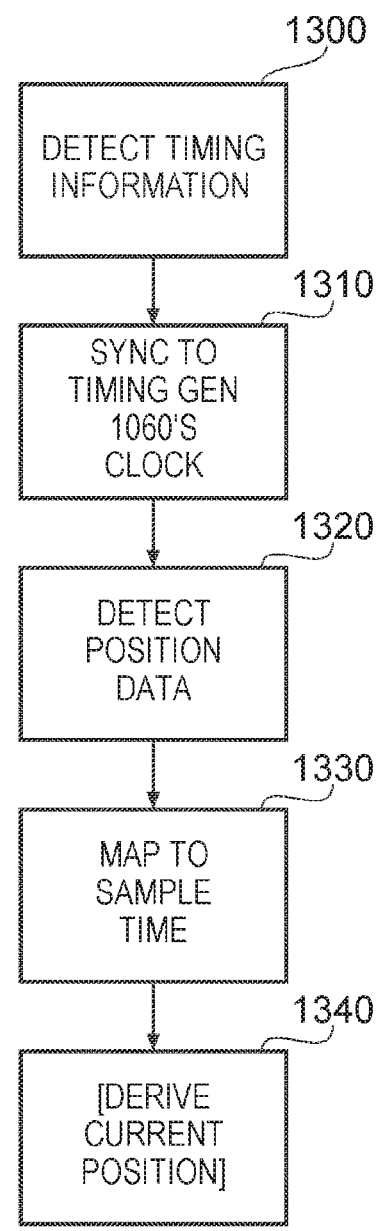
FIG. 13 is a schematic flowchart illustrating a method.

FIG. 13 is a schematic flowchart illustrating an example of these techniques, representing operations of the data processing apparatus 1010.

At a step 1300, the data processing apparatus 1010 detects the timing information provided from the timing generator 1060 via the second data communication path (in this example, the display 1080 and the camera 1090). It is noted that the second communication path has a lower latency than the communication path 1075, and for the present purposes may be considered as having a substantially zero latency.

At a step 1310, the data processing apparatus 1010 synchronises a clock signal at the data processing apparatus 1010 to the timing generator 1060's clock signal using the detected timing information received at the step 1300.

At a step 1320, the data processing apparatus 1010 detects the position data 1220 in received transmissions from the position detector 1000 via the communication module 1070 and the path 1075.

At a step 1330, the data processing apparatus 1010 maps the detected position data to the appropriate time point S at which the position was sampled, using the timing signal 1210 associated with the position data.

The process as described according to the steps 1300 . . . 1330 allows the data processing apparatus 1010 to arrive at a slightly historical knowledge of the position of the trackable object 1040. This may be sufficient for the purposes of the data processing operations taking place at the data processing apparatus 1010. However, in other examples, an optional step 1340 involves deriving a current estimated position of the trackable object from such historical data. For example, the current position can be extrapolated from one or more recent sampled positions and the difference in real time between the current real time and the sample time at which those one or more sampled positions were obtained. A simple linear extrapolation can be used, or a polynomial extrapolation, or a filtering operation such as Kalman filtering can be utilised.

Figure 14:
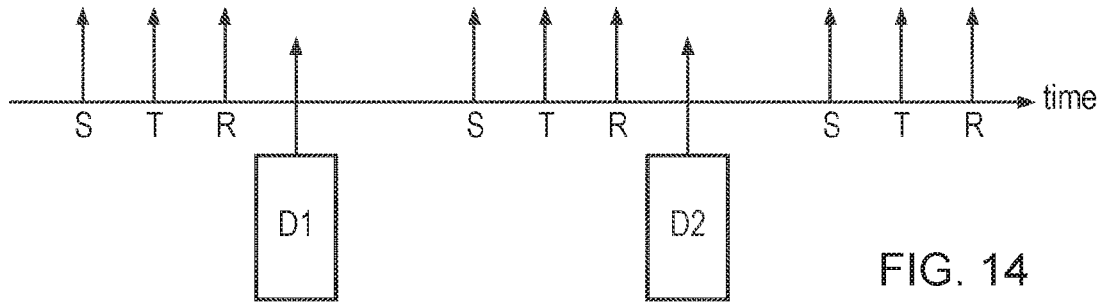
FIG. 14 is a schematic timing diagram.

FIG. 14 is another schematic timing diagram similar to the diagram of FIG. 11. Sequences of time points S, T, R are shown. These have the same meaning as discussed with reference to FIG. 11.

Communications by the second communication path, in this example the display of images or patterns D1 and D2, occur at respective points in time but these are not required to be synchronised themselves with the sampling time points. Instead, the display of the images or patterns D1, D2 simply allows a timing signal at the data processing apparatus 1010 to be synchronised with the timing signal generated by the timing generator 1060. The sampling time points are referenced against the timing signal at the position detector 1000 and, on receipt, are referenced again the same timing signal (or at least the version at the apparatus 1010 which is mapped to the same timing signal) in order to provide the real time at which the sampling took place.

Figure 15:
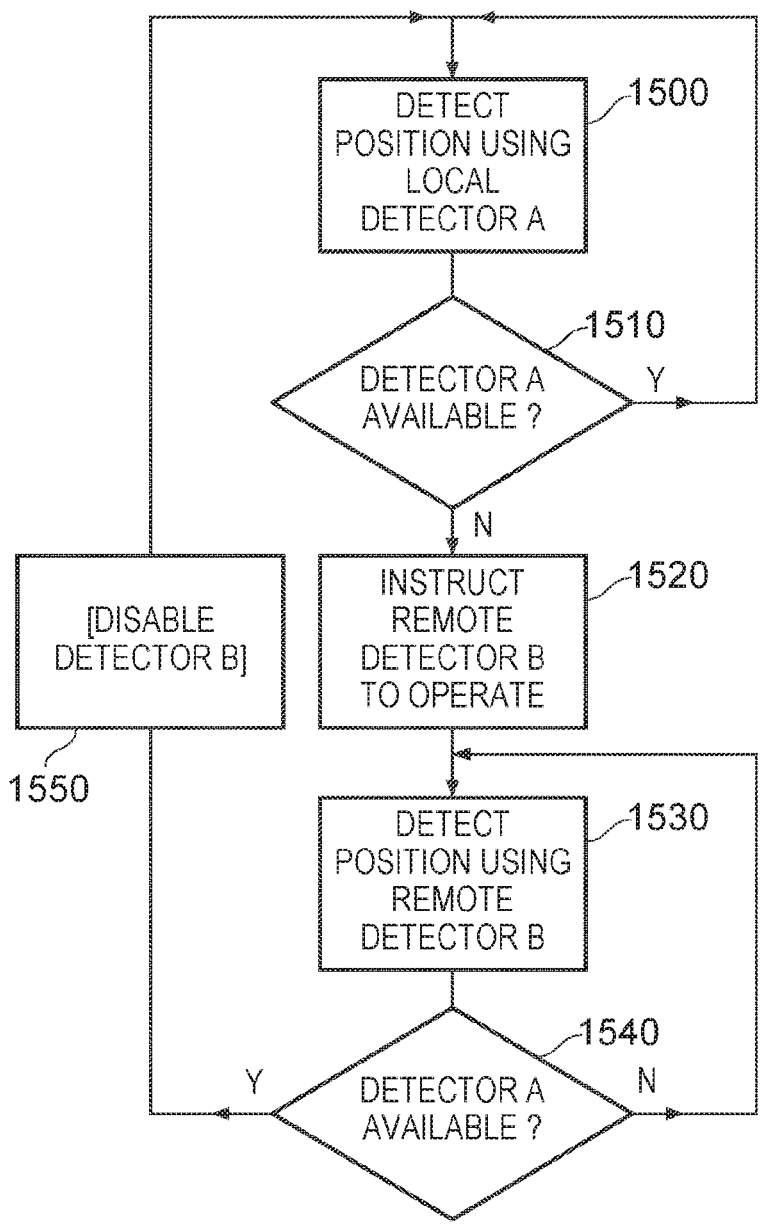
FIG. 15 is a schematic flowchart illustrating a method.

Bearing in mind that an example arrangement uses a portable telephone apparatus as the position detector 1000, an issue which can arise is the limitation in battery capacity of such a device. FIG. 15 provides a schematic flowchart illustrating a method by which the position detector 1000 is used only at some times, for example when required to alleviate a lack of information from the position tracking at the data processing apparatus itself using its own camera 1090.

In FIG. 15, a position detector "A" refers to position detection by the data processing apparatus 1010 using, for example, information obtained by the camera 1090. A position detection process "B" refers to position detection by the position detector 1000.

At a step 1500, the data processing apparatus 1010 detects (or at least attempts to detect) the position of the trackable object 1040 using the position detector A. At a step 1510, it is detected whether the detector A is available. This can indicate, for example, whether the camera 1090 has a view of the trackable object 1040 within its field of view, or whether the trackable object 1040 is (for example) obscured or occluded. For example, if the trackable object 1040 is behind the user's body with respect to the camera 1090, the camera 1090 cannot track its position.

At the step 1510, if the detector A is available, control returns to the step 1500. If not, then control passes to a step 1520.

At the step 1520, the data processing apparatus 1010 sends a signal, for example via the communication path 1075, to the position detector 1000 to instruct the position detector 1000 to detect the position of the trackable object 1040. In some examples, before this instruction is issued, the position detector 1000 may be in a quiescent (lower power) operational state.

Control passes to a step 1530 at which the position detector 1000 detects the position of the trackable object 1040, acting as the position detector B. As discussed above, the detected position is transmitted back to the data processing apparatus 1010 via the communication module 1070, and timing information is sent via the second communication path, which in this example includes the display 1080.

At a step 1540, if the detector A is now available again, then control passes back to the step 1500, via an optional step 1550 at which the detector B at the position detector 1000 is disabled once again, for example to save power. If, however, at the step 1540 the detector A remains unavailable, then control passes back to the step 1530.

Figures 16, 17, 18:
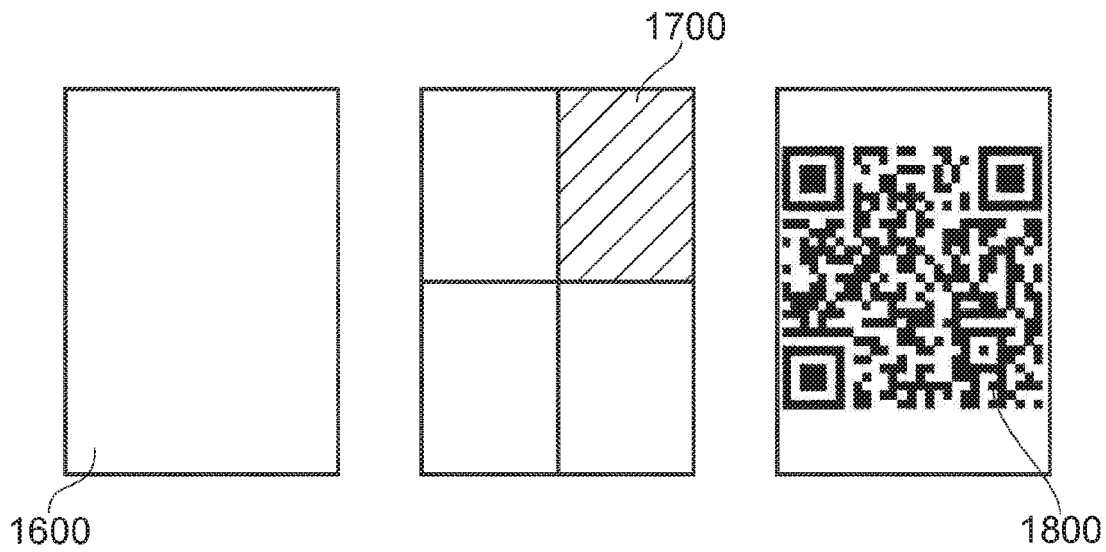
FIGS. 16 to 18 schematically illustrate example display patterns.

FIGS. 16 to 18 schematically illustrate example display patterns for display by the display 1080 as part of the second data communication path.

Various levels of data communication are required for example arrangements in order to synchronise the clock signal at the timing generator 1060 with a version of that timing signal at the data processing apparatus 1010. For example, if a timing signal having a frequency which is greater than the repetition frequency of the sampling points S is used, then the timing signal needs to be defined in some examples only to the extent of the maximum number of cycles which could occur between a time point S and the respective time point R. So, if the maximum system latency is (say) n cycles of the clock signal, the timing signal needs just to be defined to a resolution of n (or n+1) cycles.

FIG. 16 schematically illustrates an arrangement in which a display screen colour 1600 changes in synchronism with the timing signal through a pattern of colours at least equal to the number of cycles required by the discussion above.

In FIG. 17, the display screen is divided into portions and these are successively illuminated or coloured (such as a portion 1700) in turn according to a pattern detectable at the data processing apparatus 1010.

FIG. 18 schematically illustrates an encoded data field 1800 such as a so-called QR code which is displayed by the display 1080 to provide potentially more detailed information about a current time at the timing generator 1060.

Figure 19:
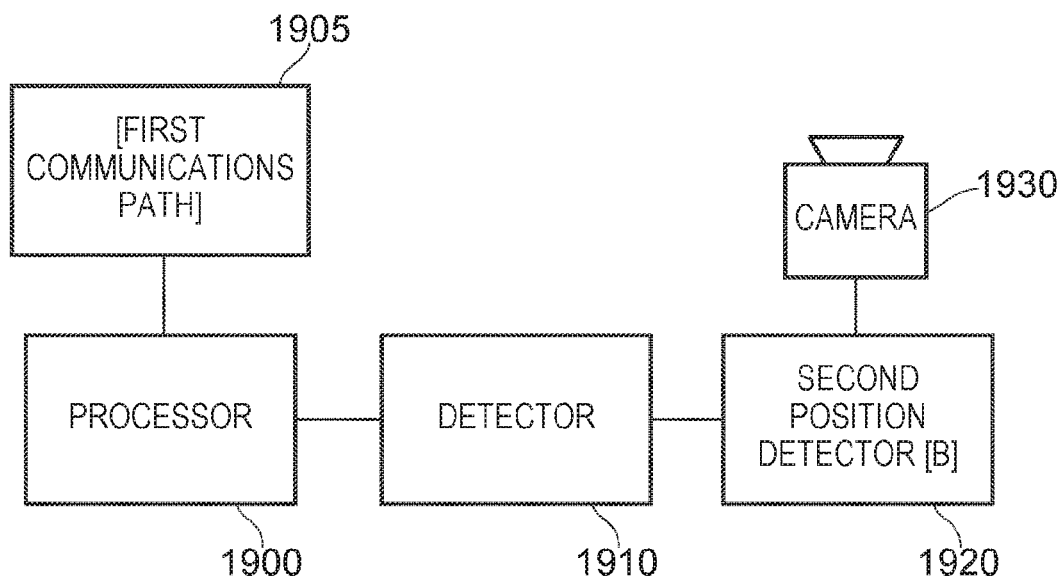
FIG. 19 schematically illustrates a system.

FIG. 19 schematically illustrates a data processing apparatus configured (in the manner described above) to receive position data and synchronisation data from a position detector configured to detect a position of a trackable object at successive sampling time points, the position detector being configured to provide, by a first data communication path (such as a wireless path, implemented at the apparatus of FIG. 19 by a module 1905), position data indicative of the position of the trackable object to the data processing apparatus at each sampling time point along with data indicating a time of that sampling time point according to a clock signal at the position detector, and to send synchronisation data to the data processing apparatus by a second, different, data communication path (implemented in the example of FIG. 19 by a camera 1930 to detect optical signals from the position detector) indicative of the clock signal at the position detector;

in which the data processing apparatus comprises:

a detector 1910 to detect a difference between a clock signal at the data processing apparatus and the clock signal at the position detector in dependence upon the synchronisation data; and a processor 1900 to perform a data processing operation in dependence upon the position indicated by the position data, the time of a sampling time point associated with that position data, and the detected difference between the clock signal at the data processing apparatus and the clock signal at the position detector.

The apparatus may comprise a second position detector 1920. This can also make use of the camera 1930.

Figure 20:
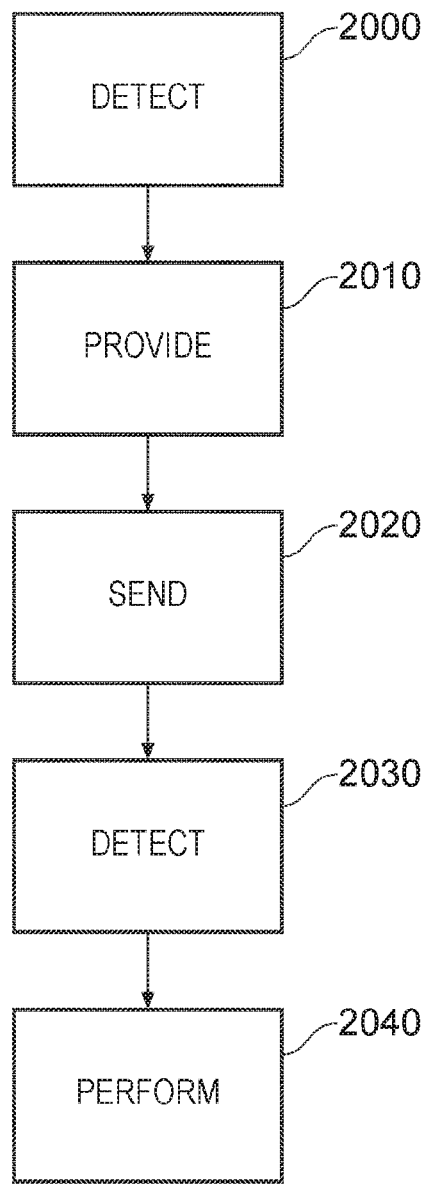
FIGS. 20 and 21 are schematic flowcharts illustrating methods.

FIG. 20 is a schematic flowchart illustrating a method comprising:

a position detector detecting (at a step 2000) a position of a trackable object at successive sampling time points;

the position detector providing (at a step 2010), by a first data communication path, position data indicative of the position of the trackable object to the data processing apparatus at each sampling time point along with data indicating a time of that sampling time point according to a clock signal at the position detector;

the position detector sending (at a step 2020) synchronisation data to the data processing apparatus by a second, different, data communication path indicative of the clock signal at the position detector;

the data processing apparatus detecting (at a step 2030) a difference between a clock signal at the data processing apparatus and the clock signal at the position detector in dependence upon the synchronisation data; and the data processing apparatus performing (at a step 2040) a data processing operation in dependence upon the position indicated by the position data, the time of a sampling time point associated with that position data, and the detected difference between the clock signal at the data processing apparatus and the clock signal at the position detector.

Figure 21:
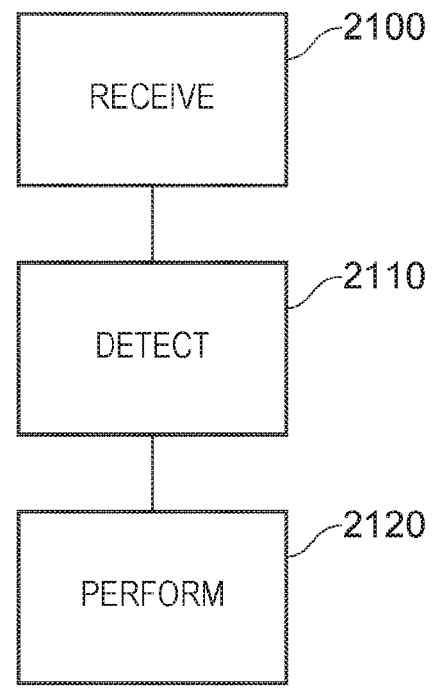

FIG. 21 is a schematic flowchart illustrating a data processing method comprising:

receiving (at a step 2100) position data and synchronisation data from a position detector configured to detect a position of a trackable object at successive sampling time points, the position detector being configured to provide, by a first data communication path, position data indicative of the position of the trackable object to the data processing apparatus at each sampling time point along with data indicating a time of that sampling time point according to a clock signal at the position detector, and to send synchronisation data to the data processing apparatus by a second, different, data communication path indicative of the clock signal at the position detector;

detecting (at a step 2110) a difference between a clock signal at the data processing apparatus and the clock signal at the position detector in dependence upon the synchronisation data; and performing (at a step 2120) a data processing operation in dependence upon the position indicated by the position data, the time of a sampling time point associated with that position data, and the detected difference between the clock signal at the data processing apparatus and the clock signal at the position detector.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A system comprising:
a data processing apparatus; and
a position detector to detect a position of a trackable object at successive sampling time points, the position detector being configured to provide, by a first data communication path, position data indicative of the position of the trackable object to the data processing apparatus at each sampling time point along with data indicating a time of that sampling time point according to a clock signal at the position detector, and to send synchronisation data to the data processing apparatus by a second, different, data communication path indicative of the clock signal at the position detector;
in which the data processing apparatus comprises:
a detector to detect a difference between a clock signal at the data processing apparatus and the clock signal at the position detector in dependence upon the synchronisation data; and
a processor to perform a data processing operation in dependence upon the position indicated by the position data, the time of a sampling time point associated with that position data, and the detected difference between the clock signal at the data processing apparatus and the clock signal at the position detector.

2. The system according to claim 1, wherein the first communication path has a higher communication latency than the second communication path.

3. The system according to claim 1, wherein the first communication path is a wireless communication path.

4. The system according to claim 3, wherein the first communication path is selected from: a Bluetooth® communication path; and a wireless network communication path.

5. The system according to claim 1, wherein:
the position detector comprises an optical emitter;
the data processing apparatus comprises a camera; and
the second communication path comprises an optical communication path from the optical emitter to the camera.

6. The system according to claim 5, wherein the optical emitter comprises an image display.

7. The system according to claim 6, wherein the position detector is configured to communicate at least one of the position data and the synchronisation signal by generating and displaying one or more images on the image display.

8. The system according to claim 1, wherein the position detector is configured to optically detect the position of the trackable object.

9. The system according to claim 1, wherein the data processing apparatus comprises a second position detector to detect the position of the trackable object.

10. The system according to claim 8, wherein the second position detector comprises:
the camera; and
an image processor to detect the trackable object in images captured by the camera.

11. The system according to claim 9, wherein the position detector is responsive to an indication, sent to the position detector by the data processing apparatus, to start and to stop detecting the position of the trackable object and providing the position data.

12. The system according to claim 11, wherein the data processing apparatus is configured to indicate to the position detector to start detecting the position of the trackable object and providing the position data when the second position detector does not detect the position of the trackable object.

13. The system according to claim 1 the position detector comprises a mobile telephone device.

14. The system according to claim 1 the data processing apparatus is a game processing apparatus and the data processing operation is a game processing operation.

15. A data processing apparatus configured to receive position data and synchronisation data from a position detector configured to detect a position of a trackable object at successive sampling time points, the position detector being configured to provide, by a first data communication path, position data indicative of the position of the trackable object to the data processing apparatus at each sampling time point along with data indicating a time of that sampling time point according to a clock signal at the position detector, and to send synchronisation data to the data processing apparatus by a second, different, data communication path indicative of the clock signal at the position detector; in which the data processing apparatus comprises:
a detector to detect a difference between a clock signal at the data processing apparatus and the clock signal at the position detector in dependence upon the synchronisation data; and
a processor to perform a data processing operation in dependence upon the position indicated by the position data, the time of a sampling time point associated with that position data, and the detected difference between the clock signal at the data processing apparatus and the clock signal at the position detector.

16. A method comprising:
detecting a position of a trackable object at successive sampling time points;
providing, by a first data communication path, position data indicative of the position of the trackable object to the data processing apparatus at each sampling time point along with data indicating a time of that sampling time point according to a clock signal;
sending synchronisation data to a data processing apparatus by a second, different, data communication path indicative of the clock signal at the position detector;
the data processing apparatus detecting a difference between a clock signal at the data processing apparatus and the clock signal at the position detector in dependence upon the synchronisation data; and the data processing apparatus performing a data processing operation in dependence upon the position indicated by the position data, the time of a sampling time point associated with that position data, and the detected difference between the clock signal at the data processing apparatus and the clock signal at the position detector.

17. A data processing method comprising:

receiving position data and synchronisation data from a position detector configured to detect a position of a trackable object at successive sampling time points, the position detector being configured to provide, by a first data communication path, position data indicative of the position of the trackable object to the data processing apparatus at each sampling time point along with data indicating a time of that sampling time point according to a clock signal at the position detector, and to send synchronisation data to the data processing apparatus by a second, different, data communication path indicative of the clock signal at the position detector;

detecting a difference between a clock signal at the data processing apparatus and the clock signal at the position detector in dependence upon the synchronisation data; and performing a data processing operation in dependence upon the position indicated by the position data, the time of a sampling time point associated with that position data, and the detected difference between the clock signal at the data processing apparatus and the clock signal at the position detector.

18. A non-transitory, machine-readable storage medium which stores computer software, which when executed by a computer system causes the computer system to carry out actions, comprising:

receiving position data and synchronisation data from a position detector configured to detect a position of a trackable object at successive sampling time points, the position detector being configured to provide, by a first data communication path, position data indicative of the position of the trackable object to the data processing apparatus at each sampling time point along with data indicating a time of that sampling time point according to a clock signal at the position detector, and to send synchronisation data to the data processing apparatus by a second, different, data communication path indicative of the clock signal at the position detector;

detecting a difference between a clock signal at the data processing apparatus and the clock signal at the position detector in dependence upon the synchronisation data; and performing a data processing operation in dependence upon the position indicated by the position data, the time of a sampling time point associated with that position data, and the detected difference between the clock signal at the data processing apparatus and the clock signal at the position detector.

* * * * *